US012140897B2

(12) United States Patent
Kakuta

(10) Patent No.: US 12,140,897 B2
(45) Date of Patent: Nov. 12, 2024

(54) IMAGE FORMING APPARATUS CAPABLE OF SUPPORTING MANUAL FEED TRAY AT PREDETERMINED ANGLE

(71) Applicant: KYOCERA Document Solutions Inc., Osaka (JP)

(72) Inventor: Masayuki Kakuta, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/545,562

(22) Filed: Dec. 19, 2023

(65) Prior Publication Data

US 2024/0210869 A1 Jun. 27, 2024

(30) Foreign Application Priority Data

Dec. 22, 2022 (JP) ................................ 2022-205750

(51) Int. Cl.
*G03G 15/00* (2006.01)

(52) U.S. Cl.
CPC ................................ *G03G 15/6514* (2013.01)

(58) Field of Classification Search
USPC ................................................. 399/392, 393
See application file for complete search history.

(56) References Cited

U.S. PATENT DOCUMENTS 7,778,569 B2 * 8/2010 Igarashi ............. G03G 21/1633 399/110
2014/0212195 A1 * 7/2014 Aoyama ............ G03G 21/1695 399/405

FOREIGN PATENT DOCUMENTS

JP 2016133615 A * 7/2016
JP 2019038699 A 3/2019

OTHER PUBLICATIONS

English language translation of JP 2016-133615 A to Imai, publication date Jul. 25, 2016. (Year: 2016).*

* cited by examiner

*Primary Examiner* — Leslie J Evanisko
(74) *Attorney, Agent, or Firm* — Alleman Hall & Tuttle LLP

(57) ABSTRACT

An image forming apparatus includes an opening/closing member, an arm, a manual feed tray, a wire, and a tension mechanism. The opening/closing member is rotatably supported by an apparatus body about a lower end portion thereof. The arm restricts an opening angle of the opening/closing member with respect to the apparatus body. The manual feed tray is rotatably supported by the opening/closing member about a lower end portion thereof. The wire has one end fixed to the arm and another end fixed to the manual feed tray and supports the manual feed tray when the opening/closing member is rotated downwardly in a state where the manual feed tray is rotated downwardly. The tension mechanism absorbs a slack of the wire.

4 Claims, 12 Drawing Sheets

IMAGE FORMING APPARATUS CAPABLE OF SUPPORTING MANUAL FEED TRAY AT PREDETERMINED ANGLE

INCORPORATION BY REFERENCE

This application is based upon and claims the benefit of priority from the corresponding Japanese Patent Application No. 2022-205750 filed on Dec. 22, 2022, the entire contents of which are incorporated herein by reference.

BACKGROUND

The present disclosure relates to an image forming apparatus including a manual feed tray rotatably supported by an opening/closing member.

The image forming apparatus includes an apparatus body and an opening/closing member rotatably supported by the apparatus body about a lower end portion thereof, and a sheet conveying path is formed between the apparatus body and the opening/closing member. The opening/closing member is rotated upwardly to form the sheet conveying path, and the opening/closing member is rotated downwardly to open the conveying path so that a paper jam processing or the like can be carried out. Further, a manual feed tray may be rotatably supported by the opening/closing member about a lower end portion thereof. The manual feed tray rotates from a housing attitude in which the manual feed tray is housed in the opening/closing member to a substantially-horizontal sheet feed attitude in which a sheet can be placed manually.

When the opening/closing member is rotated downwardly in a state where the manual feed tray is rotated to the sheet feed attitude, the manual feed tray tilts downwardly, and a sheet placed thereon may fall. In this regard, the image forming apparatus may have a configuration for maintaining the sheet feed attitude of the manual feed tray regardless of the rotation of the opening/closing member. For example, there is known, as the related art, an image forming apparatus including a link member which couples the apparatus body and the opening/closing member, a flexible linear member having one end fixed to the link member and the other end fixed to the manual feed tray, and a tension mechanism which absorbs a slack of the flexible linear member caused by the rotation of the manual feed tray. In the image forming apparatus according to the related art, when the manual feed tray is rotated to the sheet feed attitude and the opening/closing member is opened, the link member moves to pull the linear member so that the manual feed tray is maintained at an angle that is enough to prevent the sheet from falling.

SUMMARY

An image forming apparatus according to the present disclosure includes an apparatus body, an opening/closing member, an arm, a manual feed tray, a stopper, a wire, and a tension mechanism. The opening/closing member is rotatably supported by the apparatus body about a lower end portion thereof, is rotated upwardly to form a conveying path of a sheet while opposing the apparatus body, and is rotated downwardly to open the conveying path. The arm connects the opening/closing member and the apparatus body and restricts an opening angle of the opening/closing member with respect to the apparatus body. The manual feed tray is rotatably supported by the opening/closing member about a lower end portion thereof and is rotated downwardly to enable a sheet to be placed thereon. The stopper connects the manual feed tray and the opening/closing member and restricts an opening angle of the manual feed tray with respect to the opening/closing member. The wire has one end fixed to the arm and another end fixed to the manual feed tray and supports the manual feed tray at an angle at which the sheet placed on the manual feed tray does not fall when the opening/closing member is rotated downwardly in a state where the manual feed tray is rotated downwardly. The tension mechanism absorbs a slack of the wire caused by the rotations of the opening/closing member and the manual feed tray. Further, the tension mechanism is provided at a portion of the opening/closing member excluding a portion where the conveying path is provided, the tension mechanism being provided along a width direction orthogonal to a conveying direction of the sheet along the conveying path.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an image forming apparatus according to an embodiment of the present disclosure will be described with reference to the drawings.

Figure 1:
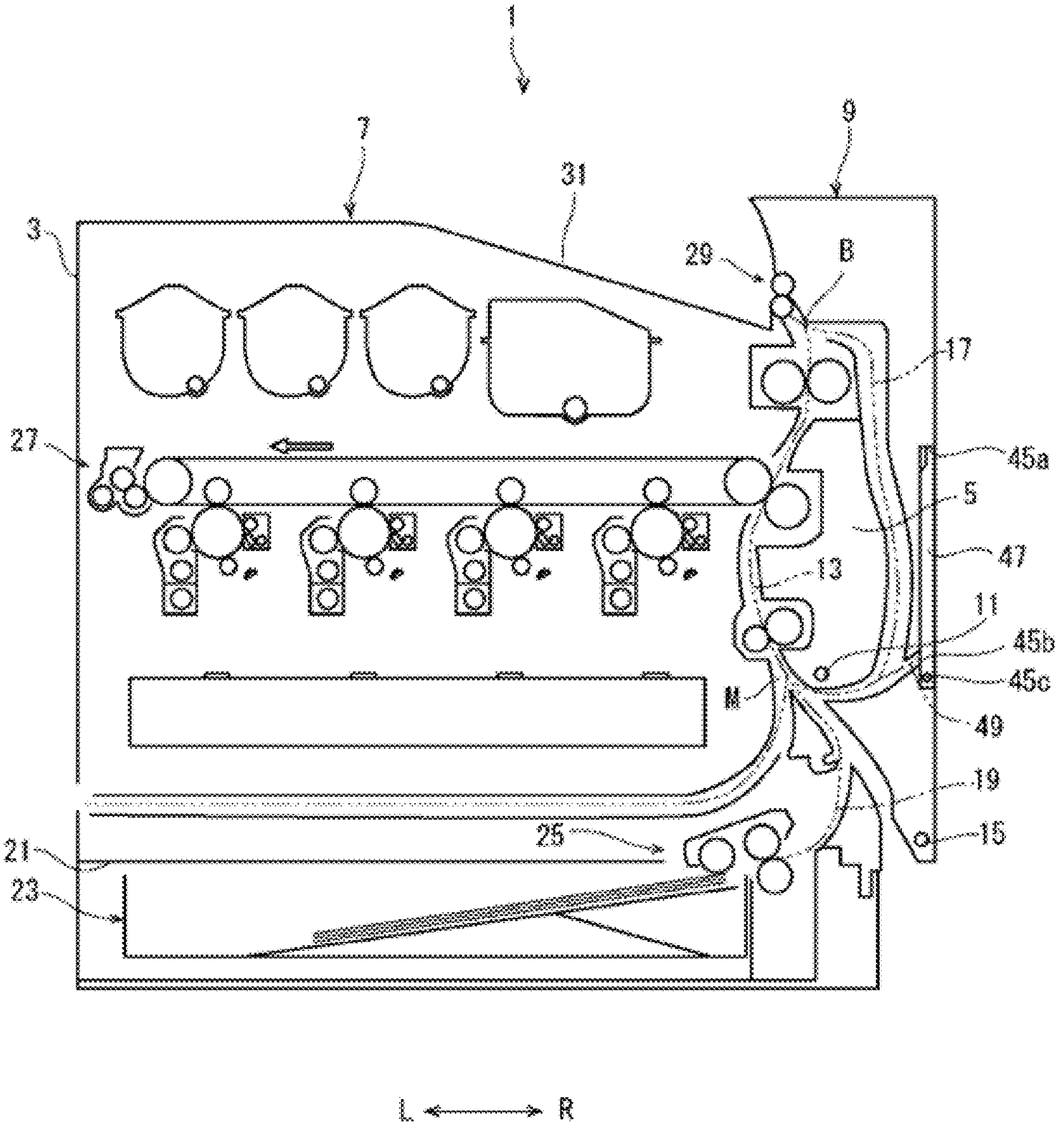
FIG. 1 is a front view schematically showing an internal structure of an image forming apparatus according to an embodiment of the present disclosure.

With reference to FIG. 1, an overall configuration of an image forming apparatus 1 according to the present embodiment will be described. FIG. 1 is a front view schematically showing an internal structure of the image forming apparatus 1. Fr, Rr, L, and R in the figures respectively indicate a front side, rear side, left side, and right side of the image forming apparatus 1.

The image forming apparatus 1 includes an apparatus body 7 including a body unit 3 and a conveying unit 5, and a cover 9. A lower end portion of the conveying unit 5 is rotatably supported by a rotation shaft 11 provided on a right side surface of the body unit 3. A main conveying path 13 of a sheet provided along a longitudinal direction is formed between the body unit 3 and the conveying unit 5. The sheet is conveyed on the main conveying path 13 along a conveying direction directed from a lower side toward an upper side. The cover 9 is arranged outside the conveying unit 5. A lower end portion of the cover 9 is rotatably supported by a rotation shaft 15 provided on the right side surface of the body unit 3. An inverted conveying path 17 is formed between the conveying unit 5 and the cover 9, and a sheet feed conveying path 19 is formed between the body unit 3 and the cover 9. The inverted conveying path 17 branches from the main conveying path 13 at a branch point B on an upstream side and joins the main conveying path 13 at a junction M on a downstream side.

A cassette storing portion 21 is provided at a lower portion of the body unit 3. The cassette storing portion 21 is opened on a front side of the body unit 3. In the cassette storing portion 21, a sheet feed cassette 23 is stored while being removable/detachable via the opening. The cassette storing portion 21 includes a sheet feed portion 25 which feeds a sheet from the sheet feed cassette 23 to the sheet feed conveying path 19.

The body unit 3 is provided with an image forming portion 27 above the cassette storing portion 21. The image forming portion 27 forms an image on a sheet by, for example, electrophotography. In addition, a discharge device 29 is provided above the image forming portion 27. The discharge device 29 discharges a sheet formed with an image onto a discharge tray 31 formed on an upper surface of the body unit 3.

Figure 2:
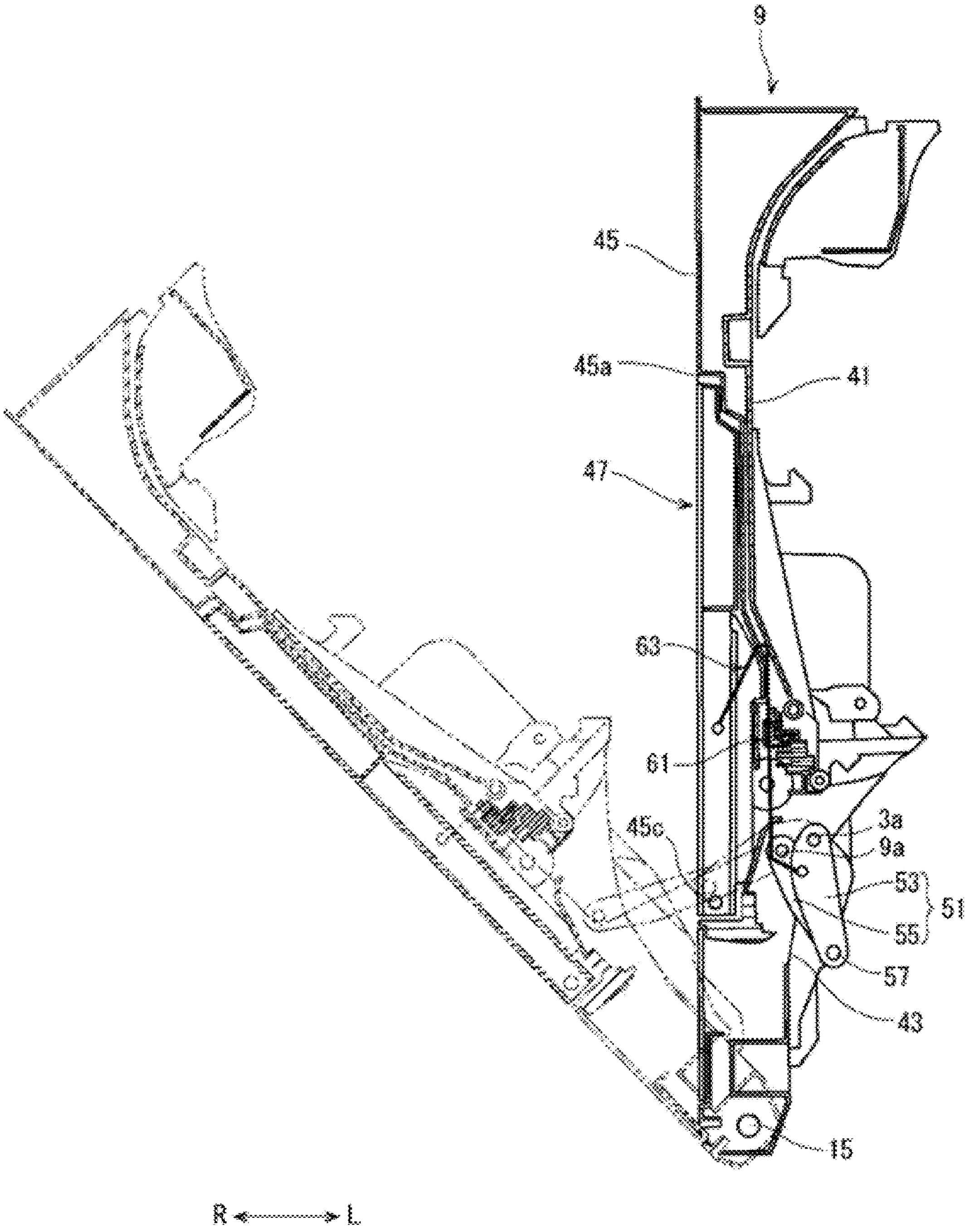
FIG. 2 is a rear view showing a cover rotated to an erect attitude in the image forming apparatus according to the embodiment of the present disclosure.
Figure 3:
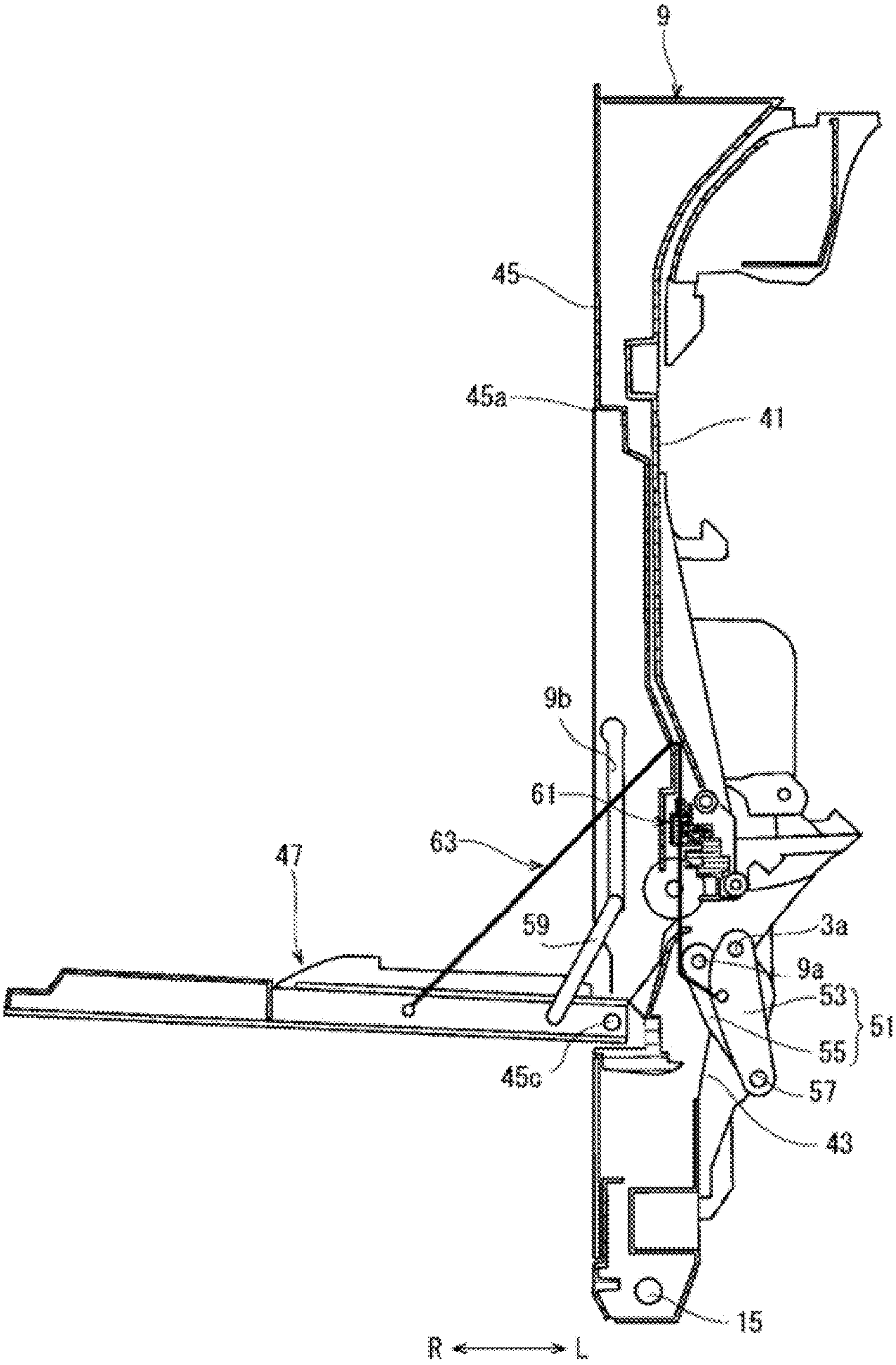
FIG. 3 is a rear view showing a manual feed tray rotated to a tilted attitude in the image forming apparatus according to the embodiment of the present disclosure.
Figure 4:
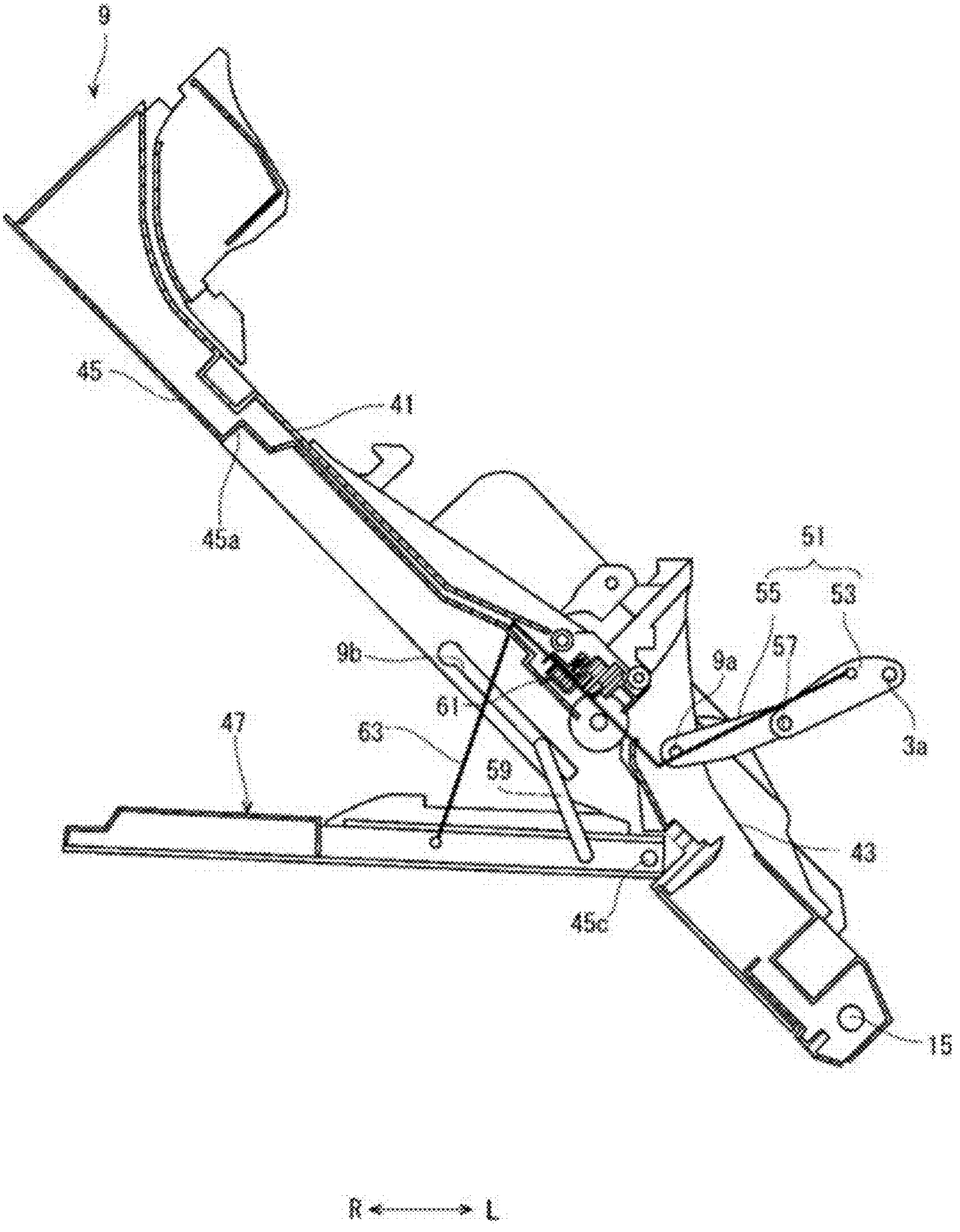
FIG. 4 is a rear view showing the cover rotated to a tilted attitude in a state where the manual feed tray is rotated to the tilted attitude in the image forming apparatus according to the embodiment of the present disclosure.
Figure 5:
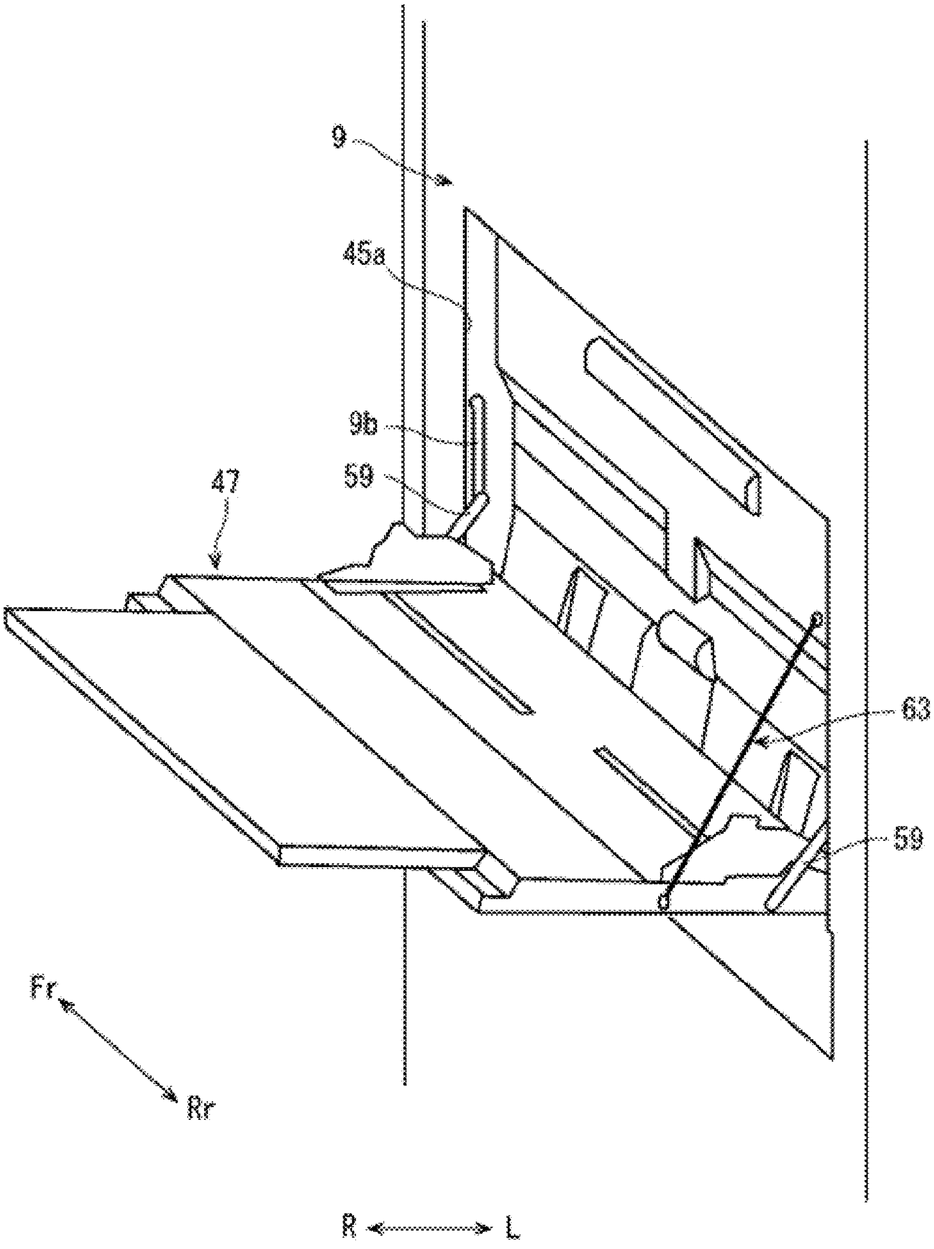
FIG. 5 is a perspective view showing the manual feed tray rotated to the tilted attitude from a rear side in the image forming apparatus according to the embodiment of the present disclosure.

Next, the cover 9 will be described with reference to FIG. 1 and FIG. 2 to FIG. 4. FIG. 2 is a rear view showing the cover 9 rotated to an erect attitude, FIG. 3 is a rear view showing a manual feed tray 47 rotated to a tilted attitude, FIG. 4 is a rear view showing the cover 9 rotated to a tilted attitude in a state where the manual feed tray 47 is rotated to the tilted attitude, and FIG. 5 is a perspective view showing the manual feed tray 47 rotated to the tilted attitude. In all of the figures, a wiring state of a wire 63 is illustrated schematically.

As shown in FIG. 2, the cover 9 includes an upper guide plate 41 which forms one of guide surfaces of the inverted conveying path 17 (see FIG. 1), a lower guide plate 43 which forms one of guide surfaces of the sheet feed conveying path 19 (see FIG. 1), and an outer cover plate 45. A lower end portion of the upper guide plate 41 is curved toward the apparatus body 7. An upper end portion of the lower guide plate 43 is curved toward the apparatus body 7.

A concave portion 45*a* is formed on an outer surface of the outer cover plate 45. A manual sheet feed port 45*b* (see FIG. 1) and a pair of front and rear rotation shafts 45*c* (see FIG. 1 and FIG. 2) are provided at a lower portion of a bottom surface of the concave portion 45*a*. Further, the cover 9 is provided with a manual feed conveying path 49 (see FIG. 1) which connects the manual sheet feed port 45*b* and the inverted conveying path 17. The manual feed tray 47 is housed in the concave portion 45*a*. The manual feed tray 47 is rotatably supported by the pair of rotation shafts 45*c*. The manual feed tray 47 will be described later.

The cover 9 rotates about the rotation shaft 15 between an erect attitude in which it rotates upwardly to form the inverted conveying path 17 and the sheet feed conveying path 19 (see the solid line in FIG. 2) and a tilted attitude in which it rotates downwardly to open the inverted conveying path 17 and the sheet feed conveying path 19 (see the dash-dot-dot line in FIG. 2). As described above, the cover 9 is an example of an opening/closing member of the present disclosure which is rotatably supported by the apparatus body 7 about a lower end portion thereof, is rotated upwardly to form a conveying path of a sheet with the apparatus body, and is rotated downwardly to open the conveying path.

The cover 9 and the apparatus body 7 are connected by a pair of front and rear arms 51. Each of the arms 51 includes a body-side arm 53 and a cover-side arm 55 that are rotatably coupled via a coupling pin 57. The body-side arm 53 is rotatably supported by a pin 3*a* of the body unit 3, and the cover-side arm 55 is rotatably supported by a pin 9*a* of the cover 9. When the cover 9 is rotated to the tilted attitude (see the dash-dot-dot line in FIG. 2), the body-side arm 53 and the cover-side arm 55 rotate in a direction in which they open from each other via the coupling pin 57, to thus restrict an opening angle of the cover 9 with respect to the apparatus body 7 at a predetermined angle. The opening angle is, for example, 45°. When the cover 9 is rotated to the erect attitude (see the solid line in FIG. 2), the arm 51 is rotated in a direction in which the body-side arm 53 and the cover-side arm 55 close via the coupling pin 57, to thus be folded.

The manual feed tray 47 includes an extendable extension tray and a pair of cursors (both of which are not shown) which are used to align sheets placed thereon in a width direction. The manual feed tray 47 rotates between an erect attitude in which it rotates upwardly to be housed in the concave portion 45*a* of the outer cover plate 45 of the cover 9 (see the solid line in FIG. 2) and a tilted attitude in which it rotates downwardly to enable a sheet to be placed thereon (see FIG. 3).

As shown in FIG. 3 and FIG. 5, the manual feed tray 47 and the cover 9 are connected by a pair of front and rear stoppers 59. One end of each of the stoppers 59 is rotatably supported by a side surface of the manual feed tray 47, and the other end is movably supported by a slit 9*b* provided in the cover 9 along the longitudinal direction. When the manual feed tray 47 is rotated downwardly (see FIG. 3 and FIG. 5), the other end of the stopper 59 moves to a lower end of the slit 9*b*, to thus restrict an opening angle of the manual feed tray 47 with respect to the cover 9 at a predetermined angle. In a state where the cover 9 is rotated to the erect attitude, the opening angle of the manual feed tray 47 with respect to the cover is 90° or less. With such an angle, the sheet placed on the manual feed tray 47 does not fall from the manual feed tray 47. When the manual feed tray 47 is rotated to the erect attitude (see the solid line in FIG. 2), the other end of the stopper 59 moves upwardly along the slit 9*b*, and thus the manual feed tray 47 is housed in the concave portion 45*a*.

Herein, when the cover 9 is rotated downwardly in a state where the manual feed tray 47 is rotated to the tilted attitude, the manual feed tray 47 tilts downwardly, and the sheet placed thereon may fall. In contrast, there is known, as the related art, an image forming apparatus including a link member which couples the apparatus body 7 and the cover 9, a flexible linear member having one end fixed to the link member and the other end fixed to the manual feed tray 47, and a tension mechanism which absorbs a slack of the flexible linear member caused by the rotation of the manual feed tray 47. In the image forming apparatus according to the related art, when the manual feed tray 47 is rotated to the tilted attitude and the cover 9 is opened, the link member moves to pull the flexible linear member so that the manual feed tray 47 is maintained at an angle that is enough to prevent the sheet from falling.

However, in the image forming apparatus according to the related art, the tension mechanism is supported by the manual feed tray 47. Therefore, there is a problem that the manual feed tray 47 may become large or the structure of the manual feed tray 47 may become complex.

Moreover, the tension mechanism may be provided in the cover 9 along one end of the conveying path in the width direction. With this configuration, when a width of a sheet to be conveyed on the conveying path becomes large, a sufficient space for arranging the tension mechanism cannot be secured.

In contrast, as will be described below, the image forming apparatus 1 according to the embodiment of the present disclosure can support the manual feed tray 47 at a predetermined angle even when the cover 9 is opened in a state where the manual feed tray 47 is rotated to the tilted attitude, using a small space.

As shown in FIG. 2 to FIG. 4, the arm 51 and the manual feed tray 47 are connected by the wire 63 via a tension mechanism 61. As shown in FIG. 4, the wire 63 supports the manual feed tray 47 at an angle that is enough to prevent the sheet placed on the manual feed tray 47 from falling (for example, 90° or less with respect to the vertical plane) when the cover 9 is rotated to the tilted attitude in a state where the manual feed tray 47 is rotated to the tilted attitude. The tension mechanism 61 absorbs a slack of the wire 63 caused by the rotations of the manual feed tray 47 and the cover 9.

Figure 6A:
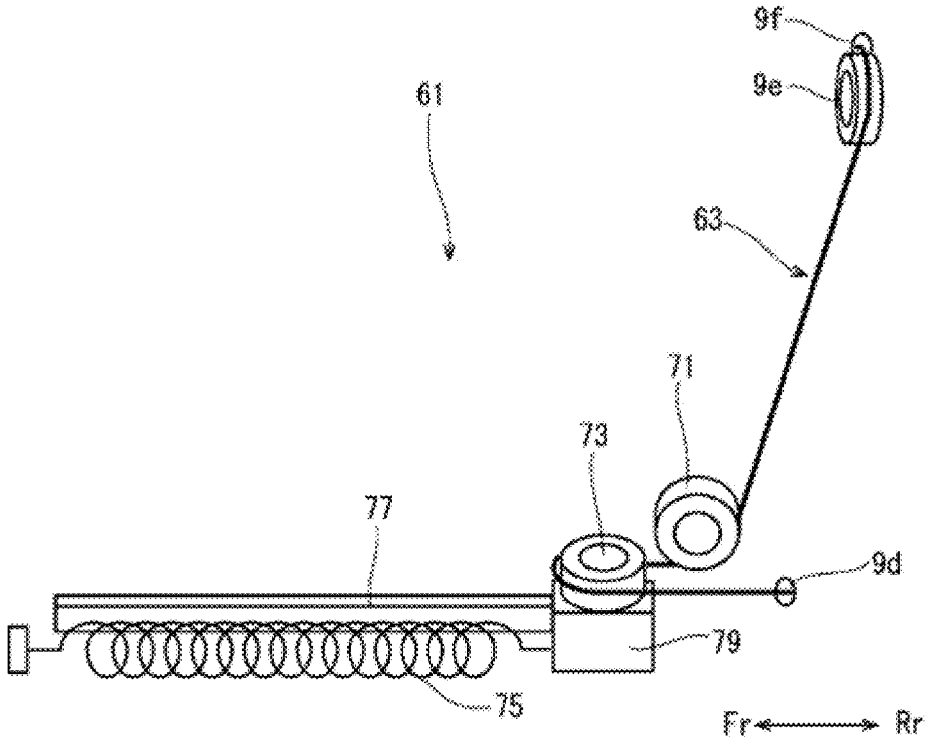
FIG. 6A is a diagram schematically showing a tension mechanism in the image forming apparatus according to the embodiment of the present disclosure.
Figure 6B:
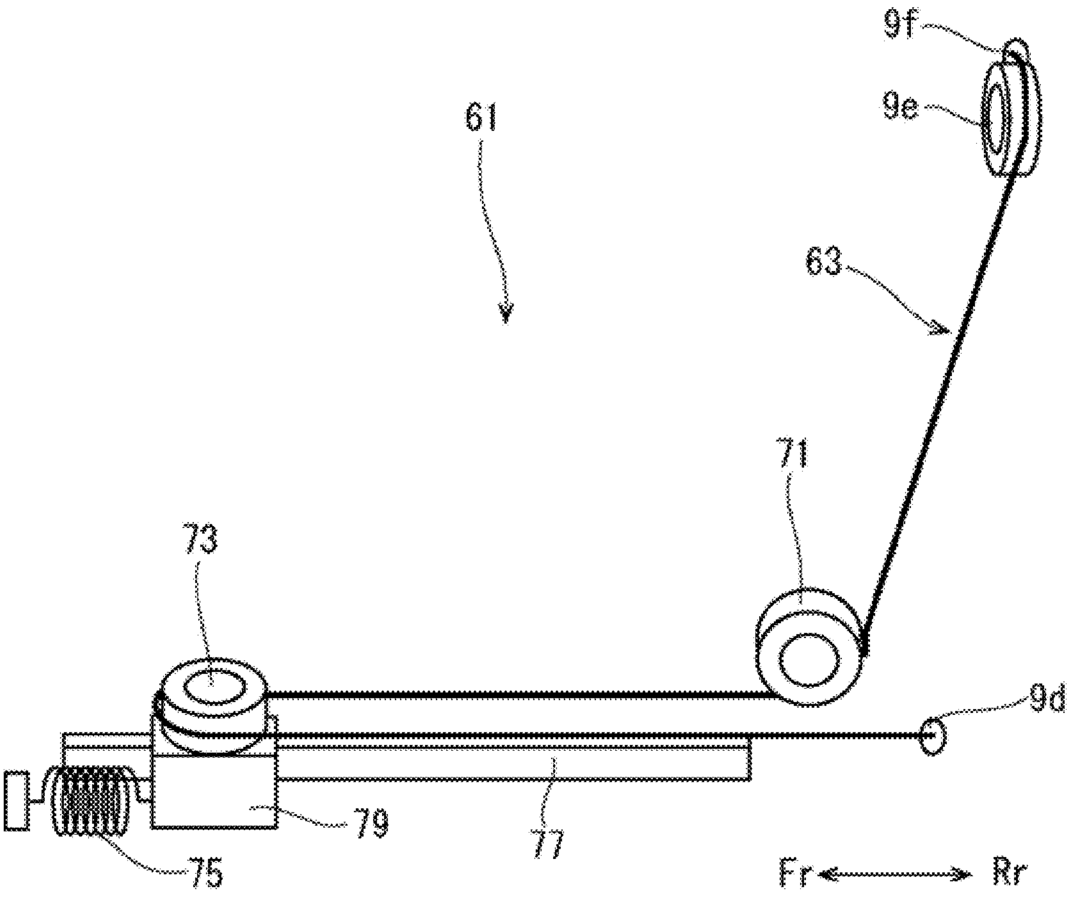
FIG. 6B is a diagram schematically showing the tension mechanism in the image forming apparatus according to the embodiment of the present disclosure.
Figure 7:
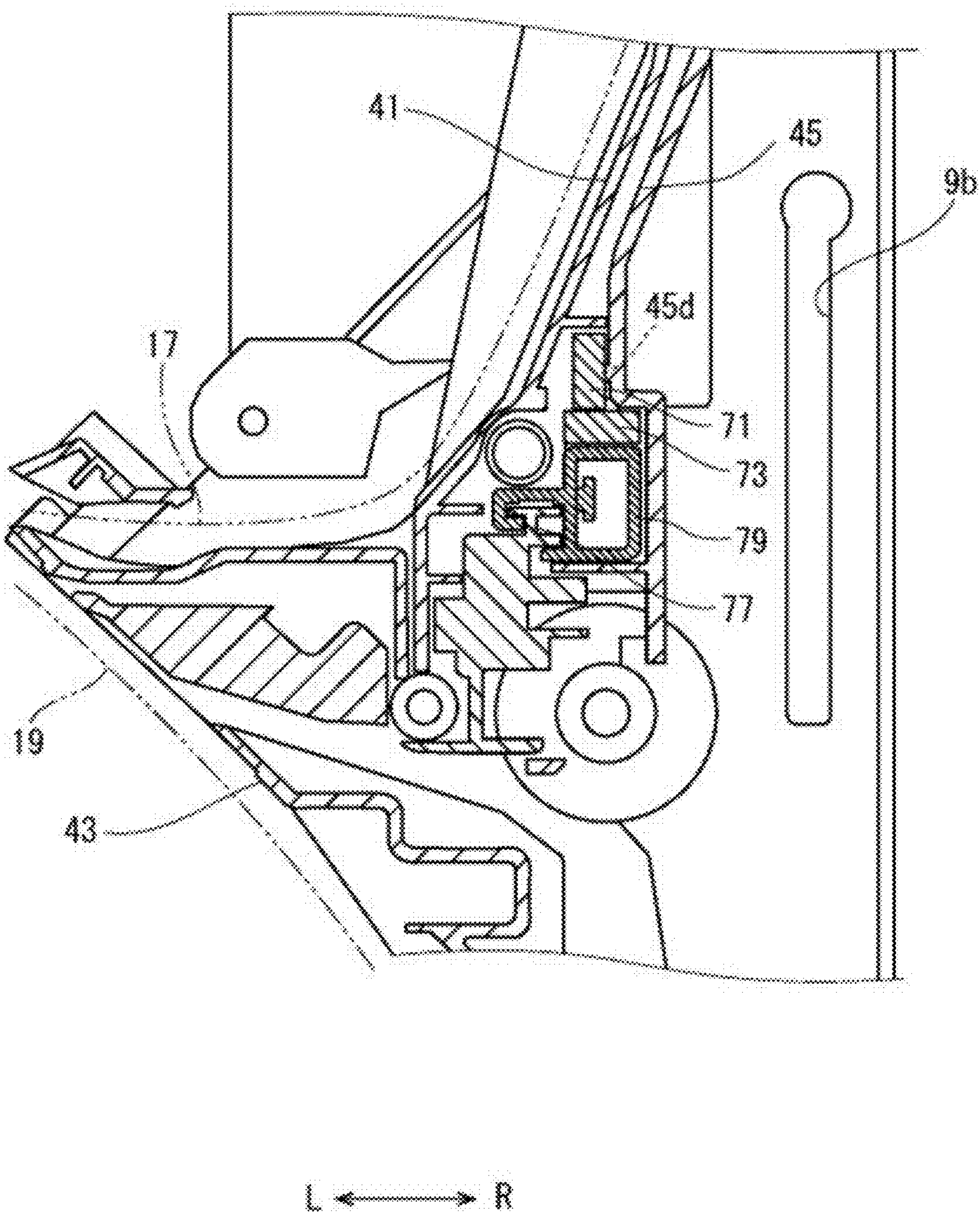
FIG. 7 is a cross-sectional view showing the tension mechanism in the image forming apparatus according to the embodiment of the present disclosure.
Figure 9A:
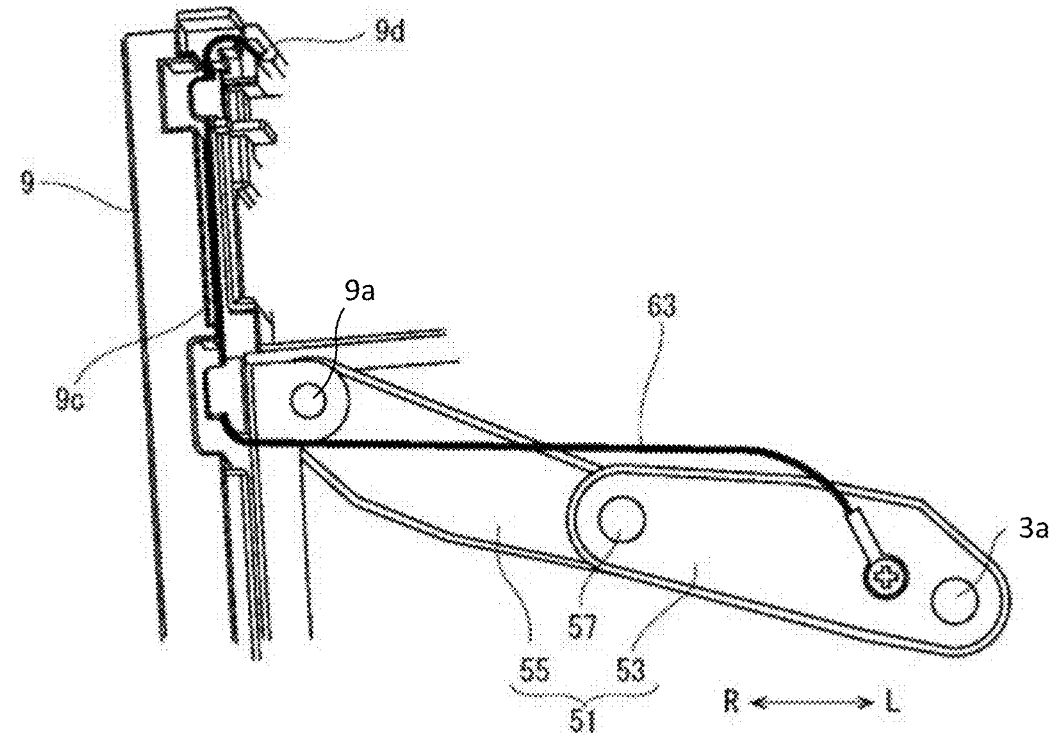
FIG. 9A is a diagram for describing wiring of a wire in the image forming apparatus according to the embodiment of the present disclosure.
Figure 9B:
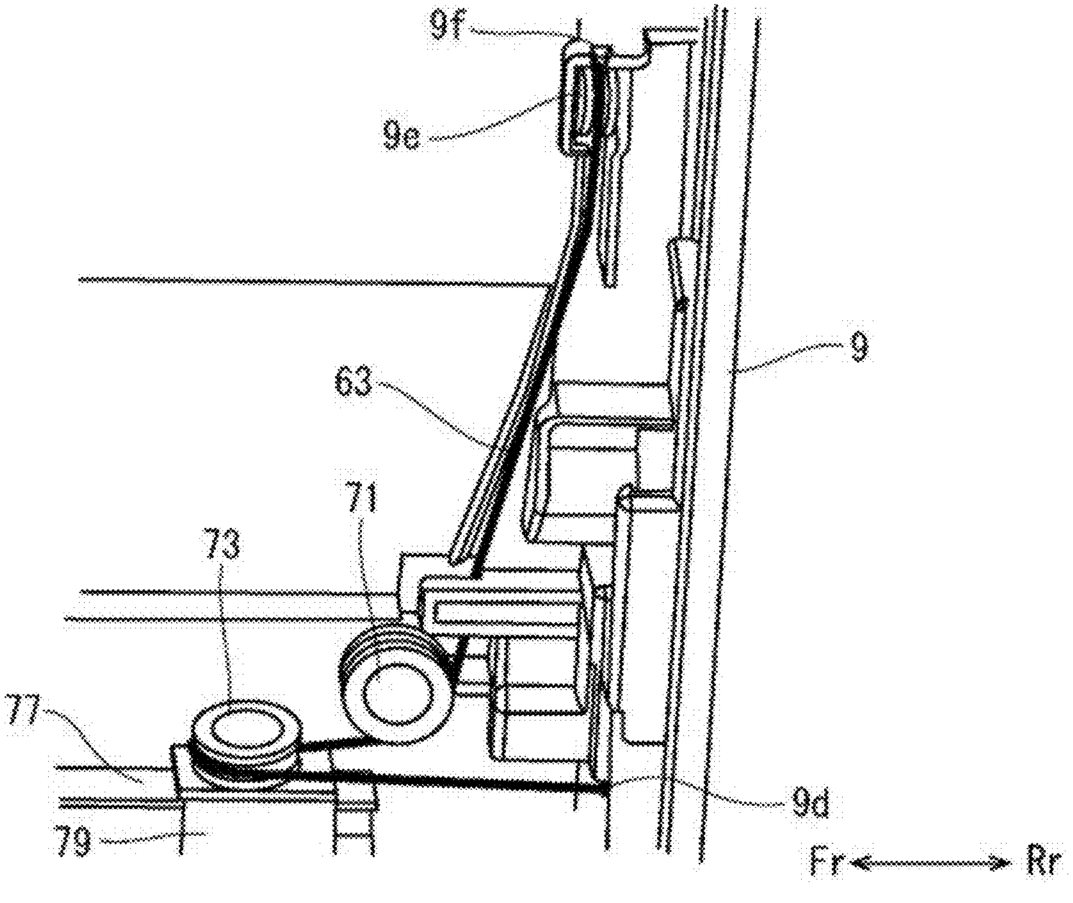
FIG. 9B is a diagram for describing the wiring of the wire in the image forming apparatus according to the embodiment of the present disclosure.
Figure 10:
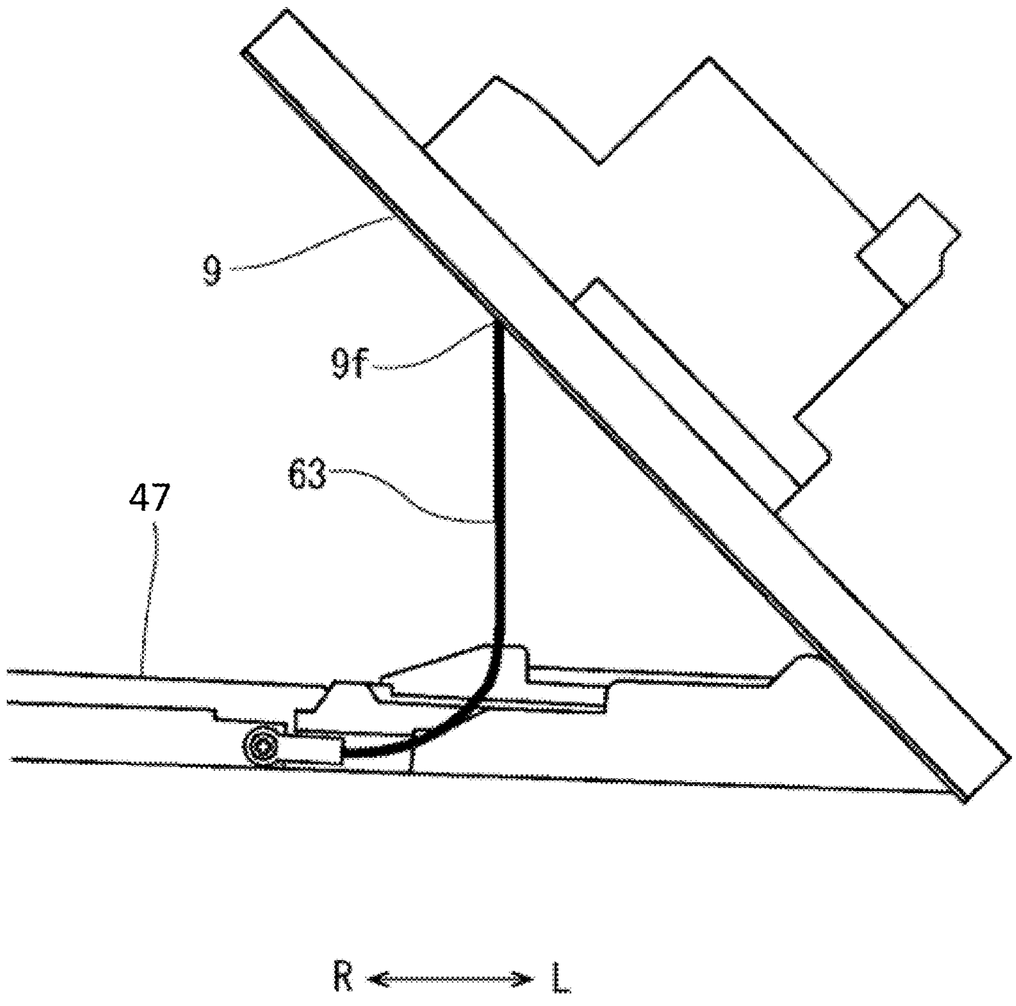
FIG. 10 is a diagram for describing the wiring of the wire in the image forming apparatus according to the embodiment of the present disclosure.

Next, the tension mechanism 61 and the wire 63 will be described with reference to FIG. 6A to FIG. 10. FIG. 6A and FIG. 6B are schematic diagrams for describing the tension mechanism 61, FIG. 7 is a cross-sectional view showing the tension mechanism 61, FIG. 8 is a perspective view showing a slider 79, and FIG. 9A to FIG. 10 are each a diagram for describing the wiring of the wire 63.

First, the tension mechanism 61 will be described. The tension mechanism 61 is provided in the cover 9 and includes a fixed pulley 71, a movable pulley 73, and a spring 75 which pulls the movable pulley 73 as shown in FIG. 6A and FIG. 6B. As shown in FIG. 7, at a position between the upper guide plate 41 and the lower guide plate 43 of the cover 9, the tension mechanism 61 is arranged between the outer cover plate 45 and the upper and lower guide plates 41 and 43. Specifically, the tension mechanism 61 is arranged between the curved lower end portion of the upper guide plate 41 and the curved upper end portion of the lower guide plate 43.

The fixed pulley 71 is rotatably supported about a rotation shaft 45*d* erected at a rear end portion of an inner surface of the outer cover plate 45. Below the fixed pulley 71, a rail 77 is provided along the front-rear direction (the width direction intersecting with the conveying direction). The slider 79 is movably supported by the rail 77.

Figure 8:
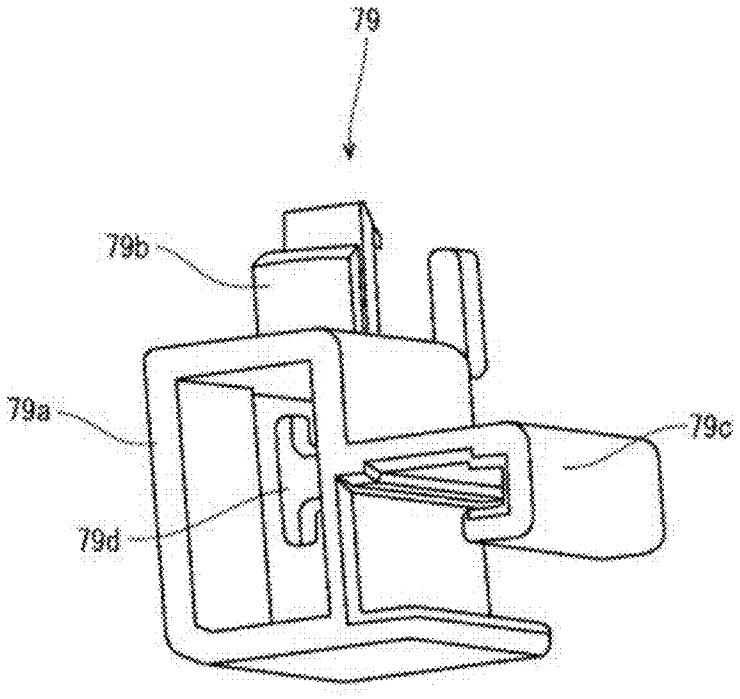
FIG. 8 is a perspective view showing a slider in the image forming apparatus according to the embodiment of the present disclosure.

As shown in FIG. 8, the slider 79 includes a body portion 79*a* having a quadrangular prism shape, a rotation shaft 79*b* provided on an upper surface of the body portion 79*a*, an engagement portion 79*c* provided on one side surface of the body portion 79*a*, and a hook 79*d* provided at a hollow portion of the body portion 79*a*. The movable pulley 73 is rotatably supported by the rotation shaft 79*b* of the slider 79. A shaft direction of the rotation shaft 79*b* is orthogonal to a shaft direction of the rotation shaft 45*d* of the fixed pulley 71. The engagement portion 79*c* engages with the rail 77. Thus, the movable pulley 73 becomes movable in the front-rear direction along the rail 77. One end of the spring 75 is fixed to the hook 79*d* of the slider 79, and the other end is fixed to a front end portion of an inner surface of the outer cover plate 45. Thus, the spring 75 pulls the slider 79, that is, the movable pulley 73 in a direction in which it is set apart from the fixed pulley 71 (front direction).

Next, the wire 63 will be described. The wire 63 has flexibility and rigidity and is constituted by a stainless wire or the like having a small stretchability in a length direction. As shown in FIG. 9A, one end of the wire 63 is fixed to the body-side arm 53 of the rear-side arm 51. The wire 63 extends upwardly from the arm 51 along a groove 9*c* provided in the cover 9 along the longitudinal direction. After that, as shown in FIG. 9B, the wire 63 passes through an opening 9*d* provided in the cover 9 to be drawn out to the front side, is wound 180° around the movable pulley 73 (FIG. 9B shows a state where the movable pulley 73 has moved to a rearmost position), and is then wound 90° around the fixed pulley 71 to extend upwardly. Then, the wire 63 passes through a through-hole 9*f* provided in the cover 9 (the outer cover plate 45) via a pulley 9*e* provided in the cover 9 (the outer cover plate 45) to be drawn out outside the cover 9. Then, as shown in FIG. 10, the other end is fixed to the side surface of the manual feed tray 47 on a rear side.

A length of the wire 63 is set such that the manual feed tray 47 can be supported at an angle at which the sheet placed thereon does not fall (for example, 90° or less with respect to the vertical plane) when the cover 9 is rotated to the tilted attitude while the manual feed tray 47 is rotated to the tilted attitude (see FIG. 4) in a state where the movable pulley 73 is moved to a rearmost end (see FIG. 6A). On the other hand, when the manual feed tray 47 is rotated to the erect attitude and the cover 9 is rotated to the erect attitude, the wire 63 sags by an amount corresponding to the length of the wire 63 between the arm 51 and the cover 9 and the length of the wire 63 between the cover 9 and the manual feed tray 47. Consequently, the movable pulley 73 (the slider 79) is pulled by the spring 75 to move in the direction in which it is set apart from the fixed pulley 71 (the front direction), and thus the slack of the wire 63 is absorbed.

The rotational operations of the cover 9 and the manual feed tray 47 accompanying the image forming operation in the image forming apparatus 1 having the configuration described above will be described with reference to FIG. 1 to FIG. 4 and the like.

When feeding a sheet from the sheet feed cassette 23, the cover 9 is rotated to the erect attitude and the manual feed tray 47 is also rotated to the erect attitude as shown in FIG. 1 and FIG. 2. In this state, the wire 63 sags most as described above. In the tension mechanism 61, as shown in FIG. 6B, the movable pulley 73 (the slider 79) is pulled by the spring 75 to move to a front end of the rail 77, and thus the slack of the wire 63 is absorbed.

In the case of one-side printing, the sheet fed from the sheet feed cassette 23 passes through the sheet feed conveying path 19 to be conveyed to the main conveying path 13. On the sheet conveyed along the main conveying path 13, an image is formed on one surface of the sheet in the image forming portion 27. The sheet formed with the image is discharged onto the discharge tray 31 by the discharge device 29. In the case of double-sided printing, a sheet having an image formed on one surface thereof is switched back by the discharge device 29 and is then conveyed to the inverted conveying path 17 at the branch point B. After that, the sheet is conveyed from the inverted conveying path 17 to the main conveying path 13 at the junction M so that an image is formed on the other surface of the sheet in the image forming portion 27. The sheet having the images formed on both surfaces thereof in this manner is discharged onto the discharge tray 31 by the discharge device 29.

When paper jam occurs in the inverted conveying path 17 or the sheet feed conveying path 19, the cover 9 is rotated from the erect attitude to the tilted attitude. As a result, as indicated by the dash-dot-dot line in FIG. 2, both the arms 53 and 55 of the arm 51 rotate in a direction in which they open from each other, and the cover 9 is maintained at a predetermined opening angle by the arm 51. At this time, the wire 63 is drawn out by an amount corresponding to a movement amount of the one end of the wire 63 (the length of the wire 63 between the arm 51 and the cover 9). Therefore, the movable pulley 73 moves to a position that is more on the rear side than the position shown in FIG. 6B against a bias force of the spring 75.

When feeding a sheet from the manual feed tray 47, the manual feed tray 47 is rotated to the tilted attitude in a state where the cover 9 is rotated to the erect attitude. As a result, as shown in FIG. 3 and FIG. 5, the manual feed tray 47 is supported at a predetermined opening angle with respect to the cover 9 by the stoppers 59. The weight of the manual feed tray 47 is applied only to the stoppers 59 and is not applied to the wire 63. In this manner, the strength of the spring 75 is set to be weaker than the weight of the manual feed tray 47. Further, when the manual feed tray 47 is rotated, the wire 63 is drawn out by an amount corresponding to the movement amount of the other end of the wire 63. Therefore, the movable pulley 73 moves to a position that is more on the rear side than the position shown in FIG. 6B against the force of the spring 75.

The sheet placed on the manual feed tray 47 passes through the manual feed conveying path 49 and the inverted conveying path 17 to be conveyed to the main conveying path 13, and the image forming operation is executed similar to the case described above.

When paper jam occurs in the inverted conveying path 17 or the manual feed conveying path 49 in a state where the manual feed tray 47 is rotated to the tilted attitude, the cover 9 is rotated from the erect attitude to the tilted attitude as shown in FIG. 4. When the cover 9 is rotated to the tilted attitude, the wire 63 is fully stretched and the movable pulley 73 moves to the rear end as shown in FIG. 6A, and thus the manual feed tray 47 is supported at the predetermined angle.

As is apparent from the descriptions above, according to the present disclosure, since the tension mechanism 61 which absorbs the slack of the wire 63 is arranged in the cover 9 along the width direction, the widths of the sheet conveying paths (the main conveying path 13, the inverted conveying path 17, and the sheet feed conveying path 19) are not affected. Therefore, even when a size (width) of a sheet on which an image is to be formed becomes large, there is no need to increase the size of the cover 9.

Furthermore, as shown in FIG. 7, the tension mechanism 61 is arranged between the upper guide plate 41 which forms one of the guide surfaces of the inverted conveying path 17 and the lower guide plate 43 which forms one of the guide surfaces of the sheet feed conveying path 19. Since the lower end portion of the upper guide plate 41 and the upper end portion of the lower guide plate 43 are formed to curve toward the main conveying path 13 (the apparatus body 7), a space is formed between the lower end portion of the upper guide plate 41 and the upper end portion of the lower guide plate 43. Since the tension mechanism 61 is arranged in this space, there is no need to newly provide a space for arranging the tension mechanism 61.

It is noted that a pulley or roller for guiding the wire 63 may be provided at a position at which a wiring direction of the wire 63 changes (for example, a position at which the wire 63 enters the groove 9*c* of the cover 9 from the arm 51 or a position at which the wire 63 is inserted into the opening 9*d* of the cover 9 from the groove 9*c* of the cover 9 in FIG. 9A). In this case, the wire 63 can be moved smoothly along with the opening/closing of the cover 9 and the manual feed tray 47.

The specific embodiment of the present disclosure has been described, but the present disclosure is not limited to the embodiment described above. The embodiment described above can be variously modified by a person skilled in the art as long as it does not depart from the range and gist of the present disclosure.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:

an apparatus body;

an opening/closing member which is rotatably supported by the apparatus body about a lower end portion thereof, is rotated upwardly to form a conveying path of a sheet while opposing the apparatus body, and is rotated downwardly to open the conveying path;

an arm which connects the opening/closing member and the apparatus body and restricts an opening angle of the opening/closing member with respect to the apparatus body;

a manual feed tray which is rotatably supported by the opening/closing member about a lower end portion thereof and is rotated downwardly to enable a sheet to be placed thereon;

a stopper which connects the manual feed tray and the opening/closing member and restricts an opening angle of the manual feed tray with respect to the opening/closing member;

a wire which has one end fixed to the arm and another end fixed to the manual feed tray and supports the manual feed tray at an angle at which the sheet placed on the manual feed tray does not fall when the opening/closing member is rotated downwardly in a state where the manual feed tray is rotated downwardly; and a tension mechanism which absorbs a slack of the wire caused by the rotations of the opening/closing member and the manual feed tray, wherein the tension mechanism is provided at a portion of the opening/closing member excluding a portion where the conveying path is provided, the tension mechanism being provided along a width direction orthogonal to a conveying direction of the sheet along the conveying path.

2. The image forming apparatus according to claim 1, wherein the tension mechanism includes a fixed pulley and a movable pulley around which the wire is wound, and a spring which pulls the movable pulley when absorbing the slack of the wire, and the movable pulley moves along the width direction.

3. The image forming apparatus according to claim 2, wherein the wire passes through, from the arm, a groove provided in the opening/closing member along a longitudinal direction, is drawn out in the width direction from an opening provided in the opening/closing member, is then wound 180° around the movable pulley, is next wound 90° around the fixed pulley, and then passes through a through-hole provided in the opening/closing member to be drawn out outside the opening/closing member, to thus be fixed to the manual feed tray.

4. The image forming apparatus according to claim 1, further comprising a sheet feed cassette, wherein the conveying path includes a sheet feed conveying path on which a sheet fed from the sheet feed cassette is conveyed, and an inverted conveying path which is provided at a higher position than the sheet feed conveying path and on which a sheet is conveyed during double-sided printing, and the tension mechanism is arranged between the sheet feed conveying path and the inverted conveying path.

* * * * *